United States Patent

Tittizer et al.

[11] Patent Number: 4,710,034
[45] Date of Patent: Dec. 1, 1987

[54] DOUBLE-CONICAL STATIC PRESSURE-TYPE GAS BEARING

[75] Inventors: Gabriel Tittizer, Rösrath-Hoffnungstal; Ewald Junghans, Bergisch Gladbach; Georg Bestenreiner, Rösrath; Christian Dahm, Cologne, all of Fed. Rep. of Germany

[73] Assignee: Interatom GmbH, Bergisch Gladbach, Fed. Rep. of Germany

[21] Appl. No.: 871,705

[22] Filed: Jun. 6, 1986

[30] Foreign Application Priority Data

Jun. 10, 1985 [DE] Fed. Rep. of Germany ....... 3520717
Apr. 10, 1986 [DE] Fed. Rep. of Germany ....... 3612097

[51] Int. Cl.⁴ .................. F16C 32/06; F16C 33/02
[52] U.S. Cl. .................. 384/110; 384/279; 384/902
[58] Field of Search .......... 384/100, 107–116, 384/279, 902

[56] References Cited

U.S. PATENT DOCUMENTS

| 2,603,539 | 7/1952 | Brewster | 384/107 |
| 3,171,295 | 3/1965 | Benckert et al. | |
| 3,210,848 | 10/1965 | Bizzigotti | 384/110 X |
| 3,445,148 | 5/1969 | Harris et al. | 384/279 |
| 3,639,074 | 2/1972 | Killick | 384/100 X |
| 3,674,355 | 7/1972 | Yearout et al. | 384/110 |
| 3,721,479 | 3/1973 | Rasnick et al. | |
| 4,153,993 | 5/1979 | Kataoka et al. | 384/107 X |
| 4,320,927 | 3/1982 | Sertich | 384/100 |

FOREIGN PATENT DOCUMENTS

| 80910 | 6/1983 | European Pat. Off. | 384/100 |
| 3230232 | 2/1984 | Fed. Rep. of Germany. | |
| 724603 | 2/1955 | United Kingdom | 384/114 |
| 1263054 | 2/1972 | United Kingdom | 384/100 |
| 1262852 | 2/1972 | United Kingdom. | |

Primary Examiner—Stuart S. Levy
Assistant Examiner—Thomas R. Hannon
Attorney, Agent, or Firm—Herbert L. Lerner; Laurence A. Greenberg

[57] ABSTRACT

Static pressure-type gas bearing for a high-speed rotary shaft, comprising a porous bearing bushing formed of a pair of hollow cone frustums connected to one another at respective narrow ends thereof.

10 Claims, 1 Drawing Figure

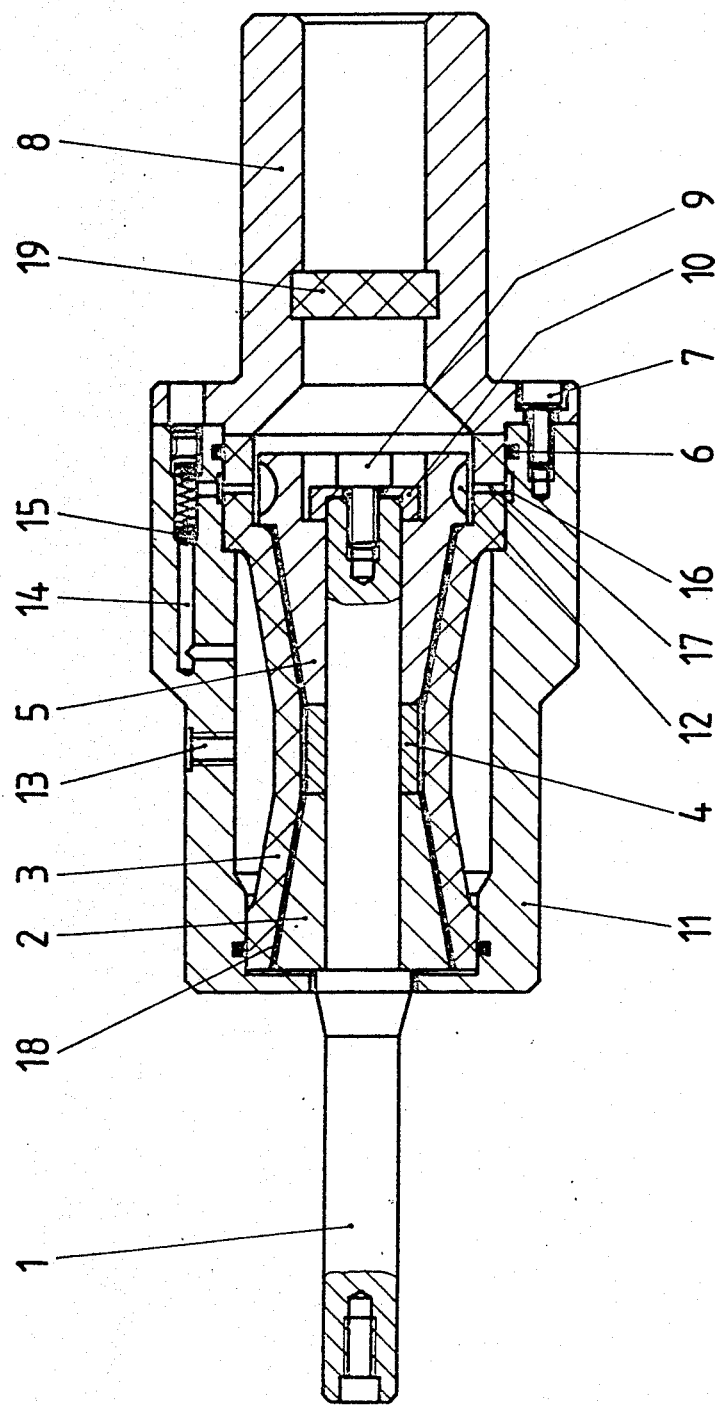

DOUBLE-CONICAL STATIC PRESSURE-TYPE GAS BEARING

The invention relates to a static pressure-type gas bearing for a high-speed rotary shaft.

Gas bearings of this general type, which are mostly operated with air and are, therefore, also referred to as aerostatic bearings, have a bearing bushing formed of sintered metal or porous ceramic materials. The bearing bushing and the shaft have a respectively hollow cylindrical and solid cylindrical shape. When the breadth or width of the bearing gap therebetween is uniform, this results in the highest gas pressure and, consequently, the greatest support or carrying capacity of the bearing being set in the middle region of the bearing, due to the gas having a better possibility for discharging at the ends of the bearing bushing. This condition favors the occurrence of instabilities, such as nutation movements, for example; the bearing surfaces can thereby come into contact with one another and become damaged.

Static pressure-type gas bearings constructed as radial as well as axial bearings have been described in Applications Serial Nos. 871704 and 871703 both filed simultaneously with the instant application and assigned to the same corporate assignee as that of the instant application. The axially acting part of the bearing lies in a plane disposed perpendicularly to the shaft axis; to be able to maintain this orientation exactly requires considerably increased expense in the practical fabrication of the bearing bushings. The emergency operating characteristics of static pressure-type gas bearings have heretofore been problematical. When the gas supply is shut off, the support or bearing capacity of the bearing can reduce so rapidly that the bearing surfaces come into contact with one another before the shaft has come to a stop. In the case of small turbines which are used for driving tools, it has been proposed that, in such situations, the gas flow which serves to drive the turbine be permitted to act upon the turbine from the opposite rotary direction in order to bring it to a stop more rapidly. This calls for an increased demand for conversion or changeover devices and is ineffective if the gas supply to the turbine is shut off together with the supply to the bearing, because both are supplied from the same source.

It is accordingly an object of the invention to provide a static pressure-type gas bearing which is able to absorb both radial and axial forces, yet is less inclined towards vibrations and has improved emergency operating characteristics over heretofore known gas bearings of this general type.

With the foregoing and other objects in view, there is provided, in accordance with the invention, a static pressure-type gas bearing for a high-speed rotary shaft, comprising a porous bearing bushing formed of a pair of hollow cone frustums connected to one another at respective narrow ends thereof. The thus proposed hourglass shape ensures that the support or carrying capacity of the bearing has both a radial as well as an axial component. In this regard, there need not be quite as great demands placed upon manufacturing accuracy as would otherwise be required. A threaded spindle with a rotatable, air-lubricated nut which, as seen in a longitudinal sectional view, appears to be formed of a plurality of double-conical sections arranged behind one another, has become known heretofore from U.S. Pat. No. 3,171,295. However, in the latter patent, the invention therein is not concerned with any rapidly rotating parts, so that the vibration behavior thereof is relatively insignificant. Due to the fact that the periphery of the bearing gap increases from the middle towards the ends thereof, the quantity of gas passing through per units of length and time, respectively, also increases. Because the periphery of the shaft does not enter into the calculation of the support or carrying capacity, but rather only the projection thereof, the support or carrying capacity increases at the ends of the bearing bushings. The shaft is therefore more strongly supported at the ends than at the middle, which is different than for the heretofore conventional cylindrical bearings. Consequently, the inclination of the shaft towards tumbling movements is thereby reduced.

In accordance with another feature of the invention, the gas bearing includes bearing members formed of plastic material and mounted on the shaft, the bearing members having a shape complementary to that of the bearing bushing. In accordance with this feature, the shaft retains its design-engineered desirable cylindrical shape and only two frustoconical bearing members formed of plastic material and matched to the conicity of the bearing bushing are mounted on the shaft. Such bodies formed of plastic material are easier to manufacture than a corresponding shaft section of the required shape. Moreover, the pairing of metal and plastic material has a much more advantageous friction coefficient than the pairing of metal and metal, whereby the emergency operating characteristics of the bearing become markedly improved.

In accordance with a further feature of the invention, the plastic material is solid polyvinyl chloride. As has been determined in practical tests, this material is especially well suited for this purpose.

In German Published Prosecuted Application (DE-AS) No. 32 30 232, a bearing bushing formed of sintered metal has been proposed wherein the bearing surfaces thereof are compressed or surface-hardened, for example, by rolling, and the pores which have been smeared over by the rolling are then opened anew by electrocorrosion.

In accordance with an added feature of the invention, the bearing bushing has a compressed bearing surface, the extent of compression varying in axial direction of the bearing surface.

Also in accordance with a cumulative feature of the invention, the bearing bushing has an etched bearing surface, the extent of etching varying in axial direction of the bearing surface. According to these last-mentioned features, the increase in carrying or support capacity at the ends of the bearing bushing is supported by an axially varying treatment of the bearing bushing and the varying porosity resulting thereby. This is especially true if, in accordance with an additional feature of the invention, the bearing bushing has a bearing surface which is compressed and etched, the extent of at least one of the compression and etching varying in axial direction of the bearing surface.

More specifically, in accordance with the invention, the extent of the compression, increases towards the middle of the bearing surface and the etching decreases towards the middle of the bearing surface.

High-speed machine tools, such as milling, boring and polishing machines, are known which are set into rotation by small turbines driven by pressure air which are mounted on the shaft. In accordance with yet a further feature of the invention, the gas bearing is in combination with a turbine wheel mounted on the rotary shaft, and includes a branching line for supplying pressure gas, the line having a first branch for supplying pressure gas to bearing bushing and a second branch for supplying pressure gas to the turbine wheel. Thus, both the bearing per se and the turbine are supplied by the same pressure gas source.

In accordance with a concomitant feature of the invention, the second branch has a check valve therein for closing off the supply of pressure gas to the turbine wheel. Thus, the check valve serves initially to stop the gas feed to the turbine when an interruption of the gas supply occurs (in which only rarely must one anticipate an abrupt loss of pressure), while the remaining, slowly reducing pressure drop is used for feeding the bearing per se until the shaft finally comes to a stop.

Other features which are considered as characteristic for the invention are set forth in the appended claims.

Although the invention is illustrated and described herein as embodied in double-conical static pressure-type gas bearing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing of the single figure which is a longitudinal sectional view of the gas bearing according to the invention.

Referring now to the figure of the drawing, there is shown therein a shaft 1 which can have a nonillustrated tool, such as a boring tool, for example, slid thereon and can be set into rotation. The shaft 1 is mounted in a bearing bushing 3 formed of sintered metal. A bearing or rolling surface of the bearing bushing 3 can be compressed or surface hardened and then electrocorroded to take care of reopening pores therein. Bearing members 2, 4 and 5 formed of plastic material and having a shape matching that of the bearing bushing 3 is slid onto the shaft 1, the bearing members 2, 4 and 5 being fixed in place by a cap 10 which is fastened to the shaft by a screw 9. The bearing bushing 3 is fitted via sealing O-rings 6 into a housing 11. An extension 8 is fastened by screws 7 to the housing 11 and serves as a discharge line for the bearing and driving air and, moreover, can be used to connect the device according to the invention with handling devices. The pressure air received from a non-illustrated conventional source enters via a connection or union 13, passes through the bearing bushing or shell 3, which can be subdivided into axial sections having a porosity extending towards the ends thereof, and escapes or drains away finally via a bearing gap 18 located between the bearing members 2, 4 and 5, on the one hand, and the bearing bushing 3, on the other hand. A line 14 branches from the connection 13 and terminates in a circular groove 16 formed in the housing 11. Radial bores 17 are formed in the bearing bushing 3 opposite the groove 16 and provide a passageway for pressure air to impinge on turbine blades 12 formed on the bearing member 5 and thereby set the shaft 1 into rotation. A check valve 15 is built into the line 14 and closes when there is not an altogether too great a reduction in the air pressure. The air feed to the turbine 12 is then completely interrupted, and the pressure air which remains is used only for supplying the bearing. The instant of complete loss of bearing capacity or power can thus be delayed until the shaft 1 comes to a stop. A sound-damping or muffling device 19 is provided for muffling the discharge noises of the turbine 12. Rotational speeds of approximately 200,000 r.p.m. can be attained with bearings according to the aforedescribed invention, with practically vibrationless operation.

There is claimed:

1. Static pressure-type gas bearing assembly for a high-speed rotary shaft, comprising a porous bearing bushing formed of a pair of hollow cone frustums connected to one another at respective narrow ends thereof, and a plurality of bearing members formed of plastic material and mountable on a shaft, said bearing members having a shape complementary to that of said bearing bushing and comprising two discrete frustoconical members having respective smaller diameter ends facing towards one another.

2. Gas bearing assembly according to claim 1, wherein said plastic material is solid polyvinyl chloride.

3. Gas bearing assembly according to claim 1, wherein said bearing bushing has a compressed bearing surface, the extent of compression varying in axial direction of said bearing surface.

4. Gas bearing assembly according to claim 1, wherein said bearing bushing has an etched bearing surface, the extent of etching varying in axial direction of said bearing surface.

5. Gas bearing assembly according to claim 1, wherein said bearing bushing has a bearing surface which is compressed and etched, the extent of at least one of the compression and etching varying in axial direction of said bearing surface.

6. Gas bearing assembly according to claim 5, wherein, respectively, the extent of the compression, increases towards the middle of said bearing surface and the extent of the etching decreases towards the middle of said bearing surface.

7. Gas bearing assembly according to claim 1, in combination with a turbine wheel mounted on the rotary shaft, including a branching line for supplying pressure gas, said line having a first branch for supplying pressure gas to said bearing bushing and a second branch for supplying pressure gas to the turbine wheel.

8. Gas bearing assembly according to claim 1, wherein said porous bearing bushing is formed of said pair of hollow cone frustums and a hollow cylinder having a diameter equal to that of said frustums at said respective narrow ends thereof, said pair of hollow cone frustums being connected to one another at said respective narrow ends thereof by said hollow cylinder.

9. Gas bearing assembly according to claim 8, wherein said bearing members having said shape complementary to that of said bearing bushing include said discrete frustoconical members and a discrete cylindrical member disposed between said respective smaller diameter ends thereof.

10. Static pressure-type gas bearing for a high-speed rotary shaft, comprising a porous bearing bushing formed of a pair of hollow cone frustums connected to one another at respective narrow ends thereof in combination with a turbine wheel mounted on the rotary shaft, including a branching line for supplying pressure gas, said line having a first branch for supplying pressure gas to said bearing bushing and a second branch for supplying pressure gas to the turbine wheel, said second branch having a check valve therein for closing off the supply of pressure gas to the turbine wheel.

* * * * *